United States Patent [19]

Tosswill

[11] 4,205,228
[45] May 27, 1980

[54] FAR FIELD IMAGING

[75] Inventor: Christopher H. Tosswill, Sturbridge, Mass.

[73] Assignee: Galileo Electro-Optics Corp., Sturbridge, Mass.

[21] Appl. No.: 921,200

[22] Filed: Jul. 3, 1978

[51] Int. Cl.² .......................... G01T 1/00; G01J 1/20
[52] U.S. Cl. ................................ 250/336; 250/203 R; 250/505
[58] Field of Search ................ 250/505, 363 R, 363 S, 250/366, 362, 236, 203 R, 336; 356/147, 141

[56] References Cited

U.S. PATENT DOCUMENTS

| | | | |
|---|---|---|---|
| 3,143,654 | 8/1964 | Aroyan et al. | 250/203 R |
| 3,230,379 | 1/1966 | Aroyan et al. | 250/203 R |
| 4,090,080 | 5/1978 | Tosswill | 250/366 |

*Primary Examiner*—Alfred E. Smith
*Assistant Examiner*—Carolyn E. Fields

[57] ABSTRACT

For imaging distant radiation sources, a collimator is rotated about its own axis while that axis moves about a fixed axis pointing toward the overall field of view of the collimator. Radiation from the source will be transmitted through the collimator during each of its revolutions about its axis. The angular position of the collimator about its axis, and the angular position of the collimator axis about the fixed axis, at the time of each such transmission, define a response plane. Computerized data reduction is used to find the intersection of the response planes, which will be a line pointing precisely at the source. For multiple sources, there will be a corresponding number of intersections.

7 Claims, 1 Drawing Figure

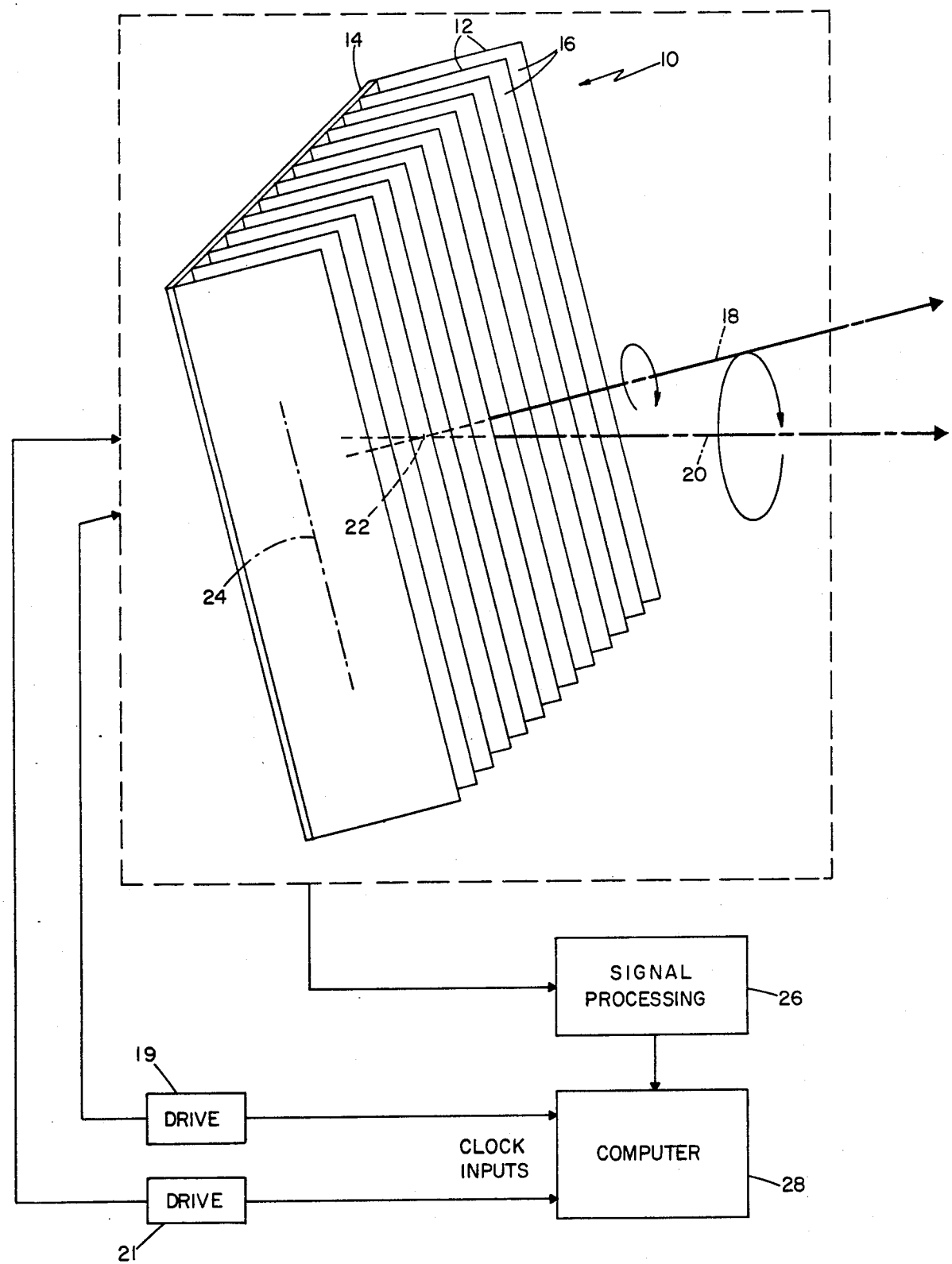

FAR FIELD IMAGING

BACKGROUND OF THE INVENTION

This invention relates to obtaining information about distant radiation sources, and is particularly useful for locating astronomical bodies.

My U.S. Pat. No. 4,090,080 (hereby incorporated by reference) describes a device useful for mapping a nearby source ("near field") of radiation, e.g., a gamma ray emitting radioisotope located in a patient undergoing a medical procedure. Each slit of the collimator is defined by a pair of parallel, radiation absorbing sheets. The collimator is rotated about its axis, and detectors are arranged to measure the radiation passing through each slit in each of many angular positions of the collimator. Simultaneous equations are then solved, applying known computer techniques, to generate the desired map.

As is mentioned in said patent, honeycomb-like channel collimators have also been used for such mapping; a single picture is taken with the collimator stationary, each channel viewing a different portion of the source. Channel collimators have also been used in x-ray astronomy, where the source is so distant ("far field") that all channels receive the same radiation flux; the collimator is mounted to pivot about orthogonal axes in a raster scan pattern.

As in the near field case, a major problem in far field imaging with channel collimators is that when the channels are made narrower or longer to improve resolution, sensitivity is reduced and a long time is required for the collimator to transmit enough radiation to assemble an image.

SUMMARY OF THE INVENTION

My invention provides excellent sensitivity and resolution in far field imaging, with a device of simple construction.

In general, a collimator is rotated about its own axis while that axis moves about a fixed axis pointing toward the overall field of view of the collimator. Radiation from the source will be transmitted through the collimator during each of its revolutions about its axis. The position of the collimator relative to its axis, and the angular position of the collimator axis relative to the fixed axis, at the time of each such transmission, define a response plane. Computerized data reduction is used to find the intersection of the response planes, which will be a line pointing precisely at the source. For multiple sources, there will be a corresponding number of intersections.

In preferred embodiments the collimator axis intersects the fixed axis and rotates about the latter along the surface of a cone at a frequency different from the frequency of rotation of the collimator about its own axis; the cone has its apex within the collimator; the collimator has slits defined by spaced, parallel sheets of radiation absorbing material (as in the near field device described in said patent); and a single detector is common to all the slits, each of which views the same radiation.

DESCRIPTION OF PREFERRED EMBODIMENT

I turn now to the structure and operation of a preferred embodiment of the invention, after first briefly describing the drawing.

DRAWING

FIG. 1 is a schematic view of the collimator and detector, with associated elements in block diagram form.

DESCRIPTION

Collimator 10 has spaced, parallel, radiation absorbing sheets 12, and may be of the same general construction described in said patent. Detector 14 is, e.g., a Geiger-Mueller tube, and is mounted on the back of the collimator to receive all radiation transmitted through slits 16. The collimator and detector are mounted (using appropriate and conventional bearings and so forth, not shown) for rotation as a unit about collimator axis 18 under the control of stepping motor drive unit 19, and for movement causing axis 18 to sweep the surface of a cone about fixed axis 20 under the control of stepping motor drive unit 21. Apex 22 of the cone (i.e., the intersection of axes 18 and 20) lies in the midplane 24 of the collimator.

Conventional signal processing circuitry 26 is connected to detector 14 to initially process the information sensed during operation of the device. Computer 28 is provided for data reduction. Drive units 19 and 21 provide clock inputs to the computer.

OPERATION

The instrument is set up by pointing axis 20 at the estimated position of the radiation source to be imaged, e.g., a celestial body, to bring the source into the overall field of view of the collimator. Detector 14 and drive 19 are turned on and collimator 10 is rotated 360° about axis 18. Then drive 21 is actuated, with drive 19 and detector 14 inactive, to swing axis 18 through a few degrees about axis 20. Detector 14 and drive 19 are again turned on for a 360° rotation of the collimator, after which axis 18 is again indexed about axis 20, and so on repeatedly until enough readings have been taken. Typically axis 18 will index at least 360° about axis 20.

Assuming a single source within the field of view of the collimator (which field can be increased by using more sheets 12), for each rotation of the collimator about its axis 18 there will be some instant at which the radiation coming from the source will be parallel to sheets 12 and will pass through a slit 16 to produce a response of detector 14. Circuitry 26 will in effect note that response and the angular positions $\alpha$ of the collimator about axis 18 and $\beta$ of axis 18 about axis 20 (both angular positions being taken relative to arbitrary reference planes), defining a unique response plane including apex 22. (In fact $\alpha$ and $\beta$ define a set of parallel planes, any one of which can be arbitrarily selected as the response plane, so long as the same selection convention is applied throughout the imaging process). Data defining such response planes for successive rotations of the collimator about axis 18 is fed to computer 28. The computer computes the common intersection of all the response planes, which will be a line pointing precisely at the source. If there are two or more sources within the field of view of the collimator there will be a corresponding number of intersections of the response planes, with each intersection line pointing to one of the sources.

Suitable computer procedures are analogous to what is described in my patent mentioned above. However, account must be taken of the angle between axis 20 and the true direction of radiation from the source; the problem is similar to that of mapping the spherical earth on a planar surface. As in map-making, a geometric projection technique must be used to accurately represent the collimator scanning in a planar coordinate system. A suitable approach would be to represent the response planes by tan $\alpha$ and tan $\beta$ instead of $\alpha$ and $\beta$.

Other embodiments are within the following claims. For example, instead of using stepping motor drives, the rotations of the collimator about axis 18 and of axis 18 about axis 20 could be continuous and simultaneous. Axis 18 might move rapidly about axis 20 a number of times while the collimator rotates more slowly about axis 18. Moreover, the motion of axis 18 might be other than conically about axis 20. Other collimator geometries should be useful with the combination of motions described. And so on.

I claim:

1. Apparatus for imaging distant radiation sources, comprising
    a collimator having an axis along which radiation can be transmitted through said collimator,
    a first drive for rotating said collimator about said axis,
    a second drive for moving said collimator to cause said collimator axis to move through a path about a fixed axis pointing toward the field of view of the collimator, and
    means for detecting radiation passing through said collimator during its rotation about said collimator axis, for different positions of said collimator axis along said path,
    each pair of values of the angular position $\alpha$ of said collimator about said collimator axis, and the position $\beta$ of said collimator axis along said path, at the time radiation passes through said collimator, defining a response plane,
    said response planes intersecting in at least one line pointing at a radiation source in said field of view.

2. The apparatus of claim 1 wherein said collimator is a slit collimator, the slits of which are defined by spaced, parallel, radiation absorbing sheets.

3. The apparatus of claim 2 wherein said sheets are x-ray absorbing.

4. The apparatus of claim 1 wherein said axes intersect.

5. The apparatus of claim 4 wherein said path is along a cone about said fixed axis.

6. The apparatus of claim 5 wherein the apex of said cone is within said collimator.

7. The apparatus of claim 1 wherein said drives are stepping motor drives for rotating said collimator through 360° cycles about said collimator axis for successive values of $\beta$.

* * * * *